E. MEPSTED.
LOCKING MEANS FOR JOINT PINS, HINGE PINS, COUPLING PINS, AND THE LIKE.
APPLICATION FILED MAR. 25, 1919.
1,329,131.                                                     Patented Jan. 27, 1920.
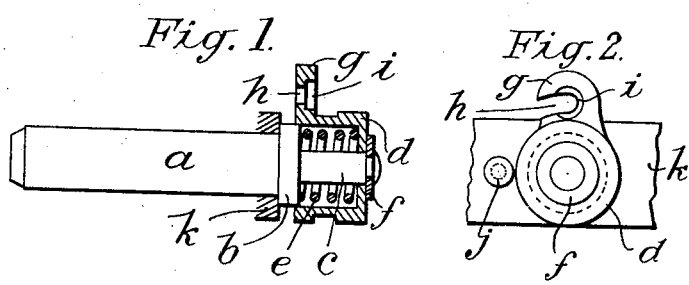

UNITED STATES PATENT OFFICE.

ERNEST MEPSTED, OF PENTONVILLE, LONDON, ENGLAND.

LOCKING MEANS FOR JOINT-PINS, HINGE-PINS, COUPLING-PINS, AND THE LIKE.

1,329,131.  Specification of Letters Patent.  Patented Jan. 27, 1920.

Application filed March 25, 1919. Serial No. 285,129.

*To all whom it may concern:*

Be it known that I, ERNEST MEPSTED, engineer, a subject of the King of Great Britain and Ireland, whose post-office address is 32/34 Rodney street, Pentonville, London, N. 1, England, have invented certain new and useful Improvements in Locking Means for Joint-Pins, Hinge-Pins, Coupling-Pins, and the like, of which the following is a specification.

This invention relates to the locking or securing of removable joint pins, hinge pins, coupling pins, fastening pins and the like employed to connect parts which require to be quickly separated or assembled and has for its object to provide a locking pin for the purposes aforesaid having positive locking means adapted when in the locking position to prevent the pin from working out or moving endwise, but permitting of the quick release and removal of the pin without the aid of tools.

According to this invention an extension is provided on the head end of the pin to receive a sleeve or socket capable both of turning and moving endwise thereon, the two movements being intended to enable a locking member on the sleeve or socket to be passed over a fixed screw or stud provided for the purpose and held in locking engagement therewith by a spring.

In the accompanying sheet of illustrative drawings:

Figure 1 is a side elevation partly in section of a locking pin constructed according to this invention.

Fig. 2 is an end elevation of the same.

As shown in the drawing a plain cylindrical pin $a$ is provided with a head or shoulder $b$ having an integral extension $c$ of reduced diameter on which the sleeve or socket $d$ is mounted. The sleeve $d$ is capable of a limited movement along the extension but is pressed by a helical spring $e$ against the stop or washer head $f$ on the outer end of the extension.

A lug $g$ projecting laterally from the inner end of the sleeve or socket is formed with a slot $h$ open at one end and leading to a circular recess or countersunk aperture $i$ formed in the center of the lug.

Coöperating with the lug is a small locking screw or stud $j$ fixed in such a position in a cheek or flange $k$ on one of the separable members to be connected by the pin that the slotted lug $g$ can be engaged with a screw when the pin is inserted in position by suitably turning the sleeve or socket about its axis and at the same time pressing it inward against the action of the spring $e$. When the head of the screw $j$ is over the countersunk part or recess $i$ formed to receive it in the lug, the sleeve or socket $d$ is released and moves outward, the spring causing the lug to bear against and engage the head of the screw in the recess thus locking the sleeve or socket and the pin to which it is attached. In order to release the pin it is only necessary to press the sleeve inward on the pin until the recess in the lug is clear of the head of the locking screw when the sleeve can be turned to move the lug out of engagement with the screw.

I claim:

1. The combination with a headed pin of the character set forth and a member in which the pin is inserted, of a fixed stud disposed in said member adjacent to the head of the pin, and a movable head adapted to engage the stud to detachably secure the pin in position.

2. The combination with a headed pin of the character set forth and a member in which the pin is inserted, of a stud fixed in said member adjacent to the head of the pin, an axially movable and rotary head on the pin adapted to engage the stud, and a spring arranged to hold the movable head in engagement with the stud.

3. The combination with a removable pin having a head at one end of a spring pressed movable locking member mounted both to slide and rotate on the head end of the pin, and a fixed locking member coöperating with the movable member to secure or release the pin.

4. A pin with locking means as set forth comprising a head on one end of the pin having an integral extension, a sleeve or socket mounted to move endwise and also to turn on said extension on the head, a spring tending to force the sleeve outward, a lug on the sleeve formed with a recessed or countersunk aperture and a slot leading thereto and a fixed stud adapted to be engaged in the aperture to secure the pin substantially as described.

5. A device of the character described comprising a plain cylindrical pin having a fixed head and an extension beyond the head of reduced diameter, a movable head mounted on the said extension, a spring on the extension between the fixed and movable heads, a lug on the movable head and means adapted to engage the lug to detachably secure the pin in position.

ERNEST MEPSTED.